(No Model.)  2 Sheets—Sheet 1.

W. H. ELKINS.
REGULATOR FOR DYNAMOS.

No. 427,164. Patented May 6, 1890.

Witnesses.
Lauritz N. Möller
John R. Snow

Inventor.
Wm. H. Elkins
by J. E. Maynadier
atty.

(No Model.) 2 Sheets—Sheet 2.

W. H. ELKINS.
REGULATOR FOR DYNAMOS.

No. 427,164. Patented May 6, 1890.

Witnesses.
Lauritz N. Möller
John R Snow

Inventor
Wm H. Elkins
by J. B. Maynadier
Atty.

THE NORRIS PETERS CO., PHOTO-LITHO., WASHINGTON, D. C.

UNITED STATES PATENT OFFICE.

WILLIAM H. ELKINS, OF CAMBRIDGE, MASSACHUSETTS, ASSIGNOR TO ALFRED D. TINGLEY, OF BOSTON, MASSACHUSETTS, AND HENRY E. IRVINE, OF NEW YORK, N. Y.

REGULATOR FOR DYNAMOS.

SPECIFICATION forming part of Letters Patent No. 427,164, dated May 6, 1890.

Application filed April 1, 1889. Serial No. 305,519. (No model.)

*To all whom it may concern:*

Be it known that I, WILLIAM HENRY ELKINS, of Cambridge, in the county of Middlesex and State of Massachusetts, have invented an Improved Regulator for Dynamos, of which the following is a specification, reference being had to the accompanying drawings, forming a part hereof, in which—

Figure 1:
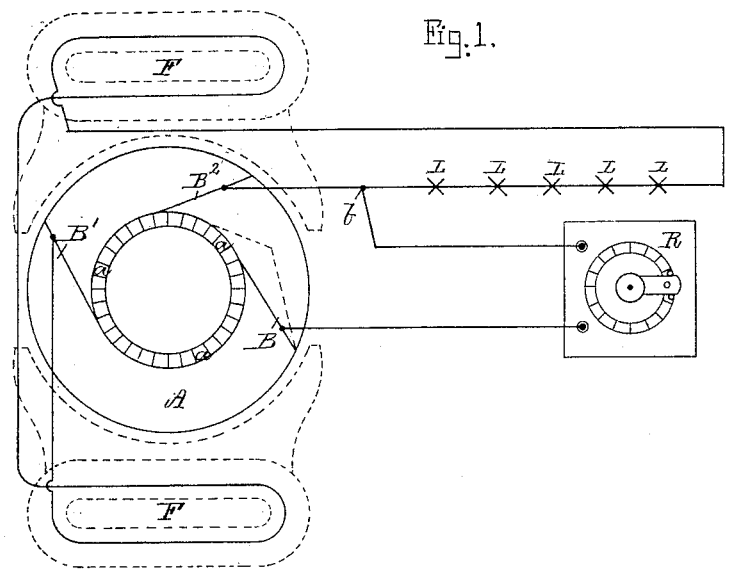
Figure 2:
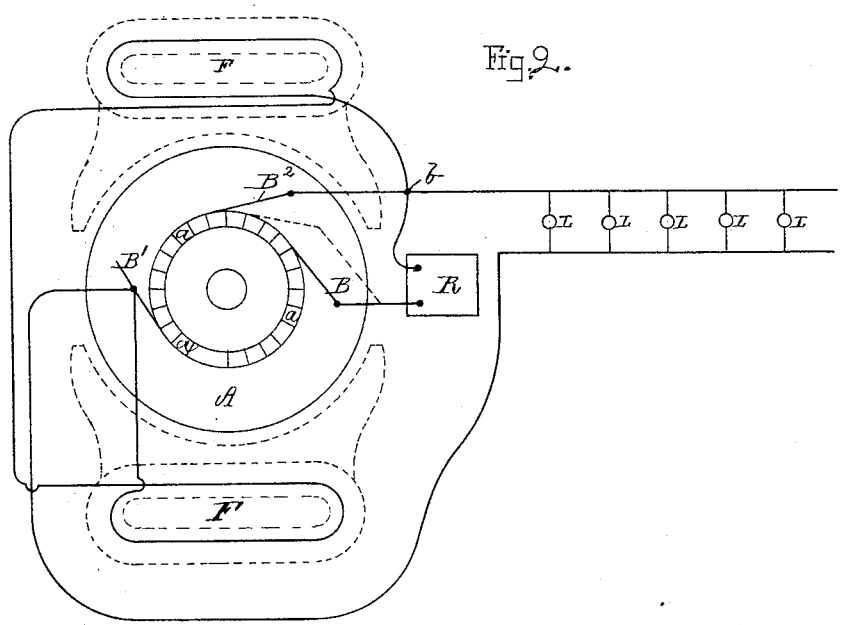
Figure 3:
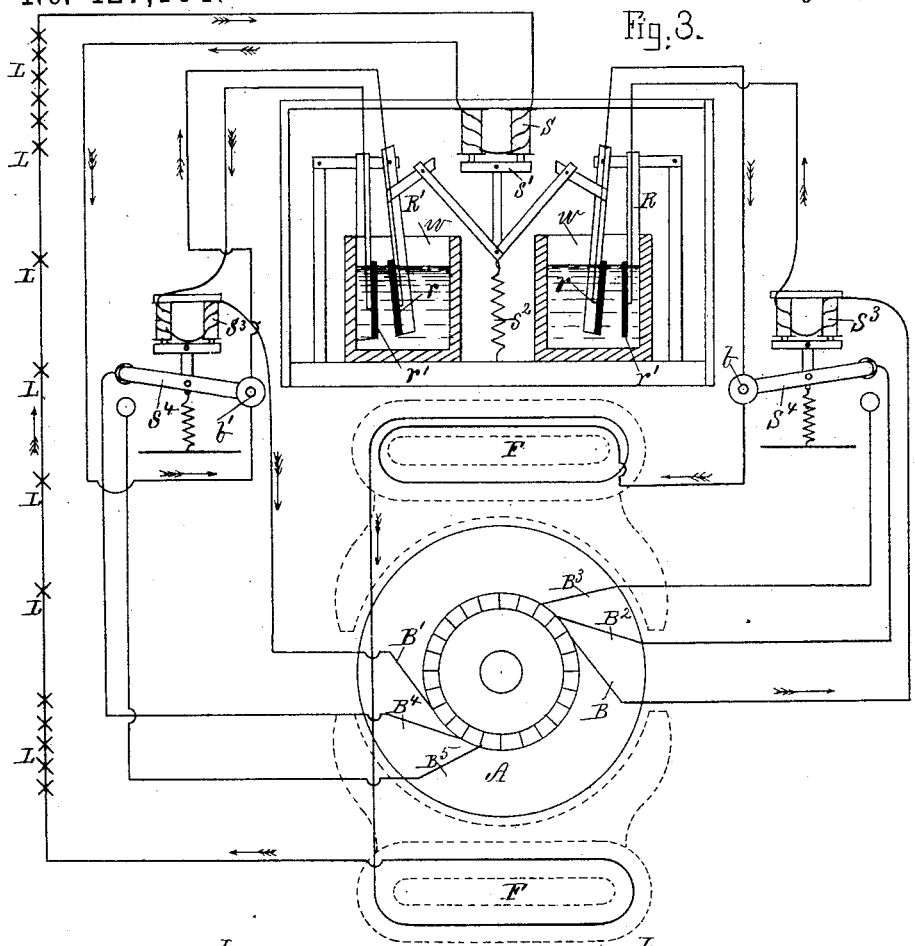
Figure 4:
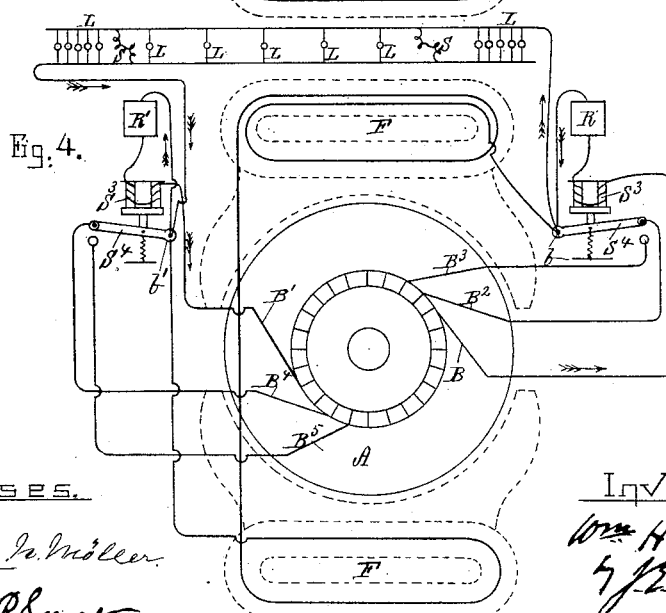

Figure 1 is a diagram illustrating the principle of my invention as applied to one pole of a constant-current dynamo, and Fig. 2 a like diagram illustrating the principle of my invention as applied to one pole of a constant-pressure dynamo. Fig. 3 is a diagram illustrating the invention which forms the subject-matter of this application as applied to a constant-current dynamo, I having already filed two applications for Letters Patent, Serial Nos. 296,753 and 304,503, for my main invention, illustrated in Figs. 1 and 2, and this present application being for an improvement upon the inventions described in my above-mentioned applications. Fig. 4 is a diagram showing the changes necessary when my present invention is used upon a constant-pressure dynamo.

In Figs. 1 and 2 the regulating-circuit B R b serves to regulate the pressure at the junction b, the pressure at b being substantially the same as the pressure at B in Fig. 1, when the load and the resistance L in the work-circuit are at the maximum in order to maintain the current constant, the resistance R in the regulating-circuit being then at the minimum, while in Fig. 2 the pressure at the junction b is maintained constant, although the current in the work-circuit is at the maximum when the load L is at the maximum and its resistance at the minimum; but, as before, the resistance R is at the minimum with the maximum load. The main difference between Figs. 1 and 2 is that the difference of potential between the brushes B and B' does not vary in Fig. 1 where the speed and the field and the current are constant, but does vary in Fig. 2, where the speed and the current through the field-magnet coils F F are constant, but the current through the armature-coils and the work-circuit varies with the load. Notwithstanding this difference, the method of regulation is much the same, and the apparatus also much the same, as will be clear to all skilled in the art, for the regulating-circuit B R b is the same in both figures, and the operation of the resistance R in both figures is to regulate the fall of potential between B and b.

In Fig. 3 I show two regulating-circuits each like the one already described. I also show two rheostats R R' of my invention, and which I find much better adapted than any other known to me for use with my regulator, but which is also generally applicable as a rheostat. In Fig. 3 the current, when all the groups of lamps are lit or under full load, is mainly from brush B to B', the plates r r' of the rheostats R R' being so near each other that the fluid between them offers little resistance, and consequently the current from brush B through junction b is nearly equal to the full current through the work-circuit, which includes the field F F, and the current from brush B² to b is slight. If one lamp out of the thirty-five (if there are seven groups of five each) be then switched out, the resistance in the work-circuit will be decreased and the current in the work-circuit will tend to increase accordingly; but any increase of current in the work-circuit will cause the solenoid S to move its armature S' against the face of spring S², thereby separating the plates r r' slightly more than when the full load was on. This increased separation of the plates r r' increases the resistance between B and b, and also decreases the pressure at b; consequently more current flows from B² to the main circuit and less from B, and the pressure at b is regulated so as to maintain the current constant through the work-circuit and the field, although the resistance of the load L is decreased.

If one-fifth of the load (or seven lamps in the case supposed) be switched out, the current in the work-circuit would greatly increase were it not for the action of the solenoid S; but as the current tends to increase the armature S' adjusts the plates r r' to keep the current constant by increasing the resistance R in the regulating-circuit and thereby regulating the pressure at junction b. The same action takes place when other lamps are switched out; but after about three-fifths of the full load have been switched out sparking will in practice be more than it should be, and solenoid S³ and switch S⁴ are introduced into the regulating-circuit to remedy this difficulty. So long as the current in the conductor joining B and $b$ exceeds a certain quantity there will be no practical trouble from sparking; but in practice when a large constant-current dynamo is used the sparking increases somewhat as the current in the conductor from B to $b$ decreases. This sparking can be prevented practically by means of a third brush B³, Figs. 3 and 4, this brush feeding the work-circuit through switch S⁴.

The switch S⁴ may of course be moved by hand; but to make the dynamo self-regulating this switch should be controlled by the solenoid S³ and its spring, as indicated in the drawings. In practice the switch S⁴ will at one position connect both brushes B² and B³ with $b$; but when the load is reduced below, say, fourteen lamps out of thirty-five the current in the conductor leading from B to $b$ will be so small that the switch S⁴ will switch in brush B³, and as the load is still further reduced the brush B² will be switched out and become idle so far as feeding the work-circuit is concerned.

What has been said of brushes B B² B³ and junction $b$ is also true of brushes B′ B⁴ B⁵ and junction $b'$, regard being had to the direction of the current, which of course is from $b'$ to B′, B⁴, and B⁵, while it is from B, B², and B³ to $b$, as indicated by the arrows.

My new rheostat R is composed of two electrodes $r\ r'$, preferably of carbon, which are inserted in a vessel W partly filled with water or other proper liquid of high resistance, and these plates are so mounted that the distance between them can be readily altered. This part of my invention is a rheostat composed of a vessel of water or like fluid, in which the swinging electrodes $r\ r'$ are mounted. I have shown only one of the electrodes $r'$ as swinging, but both may be swung, although the full effect is obtained, in my opinion, by swinging one only. A rheostat constructed as shown is extremely sensitive and yet very durable, and when combined with a solenoid S, as in Fig. 3, seems to act instantaneously, or nearly so, to so regulate the pressure at the junction $b$ as to practically prevent variations in the current in the work-circuit. The position of the armature S′ with relation to the solenoid S regulates the resistance of the rheostat R, and the position of armature S′ with relation to solenoid S depends upon the strength of the current and the opposing strength of the spring S², and any slight rise in the current above the normal changes the position of armature S′ and increases the resistance of the rheostat R R′ in Fig. 3. For great nicety of regulation the spring S² must of course be carefully adjusted in accordance with the well-known principle that a given current through the coils of solenoid S will hold the armature S′ in a certain position with relation to the solenoid against a certain force of spring S², while the same current through the solenoid S will hold the armature S′ in a certain other position against an increased or decreased force of spring S².

I have thus fully described the rheostat R and the solenoid S, not because the one is the only adjustable resistance or rheostat and the other the only instrument actuated by a tendency of a current in the work-circuit to vary which will answer, but solely because that form of rheostat and that form of indicator of variations are best adapted for use with my regulator; but it will, of course, be clear to all skilled in the art that other forms may be used as portions of a regulator embodying my main invention.

In Fig. 3 I have shown both rheostats R R′ controlled by a single solenoid S, and this is practically as well as having a solenoid S (or a voltmeter when the current in the work-circuit varies, or its equivalent, an ammeter in multiple) for each rheostat, as indicated in Fig. 4.

In Fig. 4 the coils F F of the field-magnets are not in the work-circuit, but are in a separate circuit derived from the work-circuit extending from the junction $b$ to the junction $b'$, and the action of the regulator is to keep the pressure constant at these junctions $b\ b'$. Consequently the rheostats R R′ must be controlled by a voltmeter, so that any change of pressure in the work-circuit (or in the field-circuit) will operate to vary the resistance of the rheostats R R′, or, what is practically more convenient, by means of solenoids S, so arranged in multiple that any tendency to variation of pressure will slightly increase or decrease the current through the solenoids S, and each solenoid S will regulate its rheostat R or R′. It will be clear to all skilled in the art that a single solenoid S in multiple in the work-circuit may be used in Fig. 4 for both rheostats R R′, as in Fig. 3, and also that one or both the solenoids S (shown in Fig. 4) may be in the field-circuit, for so long as the difference of potential between $b$ and $b'$ is to be maintained constant, as in Fig. 4, any tendency to variation in that difference of potential will be indicated by a solenoid whether in the work-circuit in multiple or in the field-circuit in series, for $b$ and $b'$ are the terminals practically of both circuits, and a constant pressure is to be maintained in one, but a constant current in the other.

What I claim as my invention is—

1. In a dynamo or motor, the positive regulating-circuit B R $b$, the negative regulating-circuit B′ R′ $b'$, the additional positive brush B², and the additional negative brush B⁴, the conductors from the brushes B B² uniting at $b$, and from the brushes B′ B⁴ at $b'$, so that the adjustable resistance R is in the positive regulating-circuit B R $b$ and the adjustable resistance R' in the negative regulating-circuit B' R' b', all arranged and operating substantially as described.

2. The improved rheostat above described, composed of vessel W, containing a liquid of high resistance and electrodes r r', one of them mounted on an axis, whereby their relative inclination may be varied, substantially as described.

3. In a dynamo or motor, the main brush B, the additional brushes $B^2$ $B^3$, the adjustable resistance R, the solenoid $S^3$, and switch $S^4$, the conductors from $B^2$ and $B^3$ being connected through switch $S^4$ to the junction b, and the conductors to the brushes B, $B^2$, and $B^3$, and the switch $S^4$ being actuated by variation of current in the regulating-circuit B R b, all substantially as described.

WILLIAM H. ELKINS.

Witnesses:
J. E. MAYNADIER,
JOHN R. SNOW.